United States Patent [19]
George

[11] Patent Number: 5,783,913
[45] Date of Patent: Jul. 21, 1998

[54] RASTER DISTORTION CORRECTION ARRANGEMENT

[75] Inventor: John Barrett George, Carmel, Ind.

[73] Assignee: Thomson Consumer Electronics, Inc., Indianapolis, Ind.

[21] Appl. No.: 648,146

[22] PCT Filed: Dec. 8, 1993

[86] PCT No.: PCT/US93/11911

§ 371 Date: May 23, 1996

§ 102(e) Date: May 23, 1996

[87] PCT Pub. No.: WO95/16272

PCT Pub. Date: Jun. 15, 1995

[51] Int. Cl.$^6$ .................................... H01J 29/56
[52] U.S. Cl. ................................................. 315/371
[58] Field of Search ............... 315/368.21, 368.22, 315/368.23, 370, 371

[56] References Cited

U.S. PATENT DOCUMENTS

| | | | |
|---|---|---|---|
| 3,700,958 | 10/1972 | Haferl | 315/24 |
| 3,721,857 | 3/1973 | Haferl | 315/27 |
| 4,335,333 | 6/1982 | Ramsay et al. | 315/371 |
| 4,378,516 | 3/1983 | Smith | 315/370 |
| 4,642,530 | 2/1987 | Rodriguez-Cavazos | 315/371 |
| 4,668,897 | 5/1987 | Haferl | 315/371 |
| 4,682,085 | 7/1987 | Haferl et al. | 315/371 |
| 4,687,972 | 8/1987 | Haferl | 315/371 |
| 4,777,411 | 10/1988 | O'Connor et al. | 315/371 |
| 4,777,412 | 10/1988 | Leonardi | 315/371 |
| 4,795,949 | 1/1989 | Wilber | 315/397 |
| 4,810,939 | 3/1989 | Watanabe et al. | 315/371 |
| 4,827,193 | 5/1989 | Watanuki et al. | 315/371 |
| 4,972,127 | 11/1990 | Rodriguez-Cavazos et al. | 315/371 |
| 5,034,664 | 7/1991 | Fernsler et al. | 315/370 |

*Primary Examiner*—Theodore M. Blum
*Attorney, Agent, or Firm*—Joseph S. Tripoli; Joseph J. Laks; Sammy S. Henig

[57] ABSTRACT

A vertical rate signal generator is coupled to an integrator for producing a vertical rate parabola signal. The parabola signal is applied to a band-pass filter for producing a vertical rate sinusoidal signal that is applied to a convergence winding. When a loss of the horizontal synchronizing signal occurs, the frequency of the sawtooth signal decreases. As a result, the DC, average level of the sinusoidal signal varies, during a transition interval, following restoration of the horizontal synchronizing signal. The band-pass filter filters out low frequency components. The duration of the transient interval is thereby reduced in a manner to reduce picture bounce. The peak amplitude of the sawtooth signal is also clipped for reducing the variation of the average level of the sinusoidal signal.

11 Claims, 5 Drawing Sheets

NORMAL

NORMAL

CHANNEL CHANGE

CHANNEL CHANGE

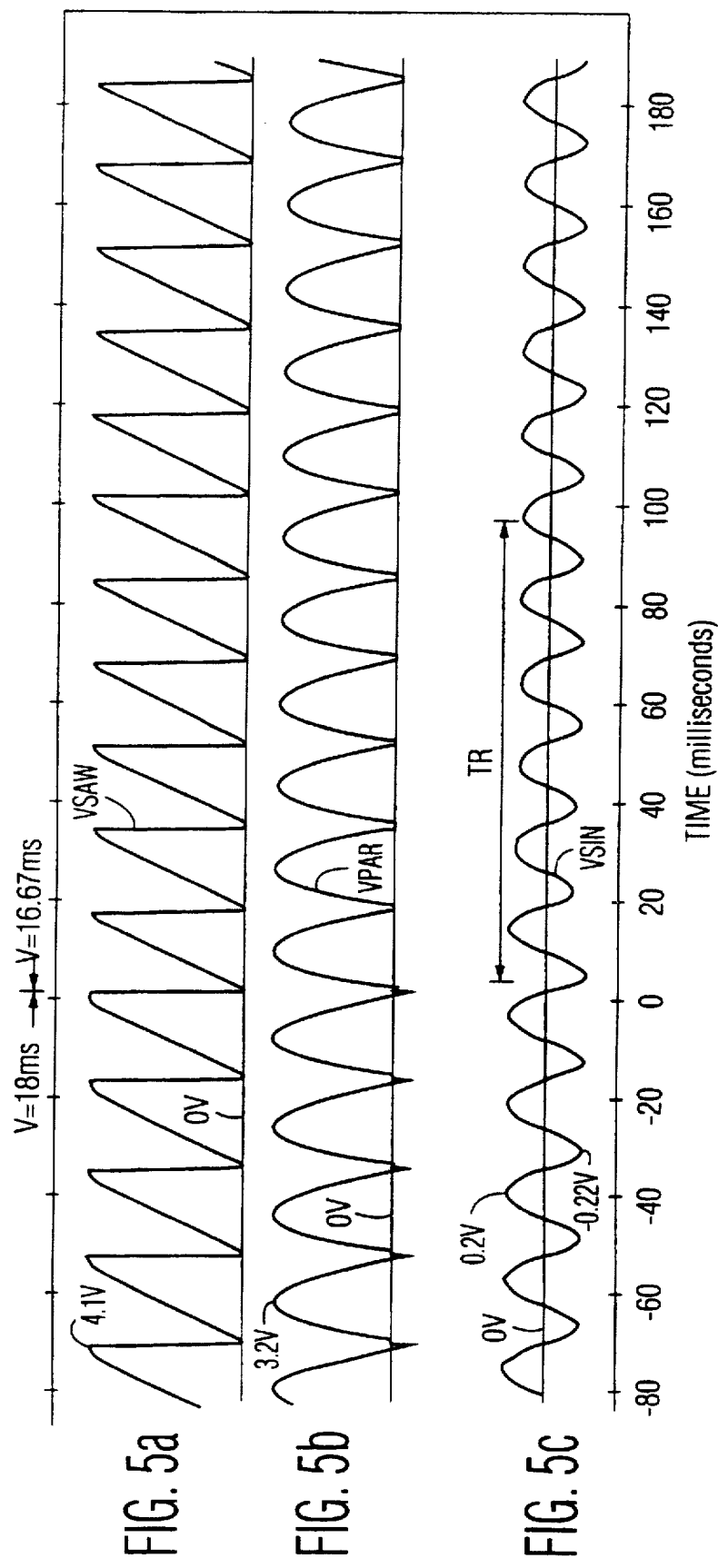

RASTER DISTORTION CORRECTION ARRANGEMENT

The invention relates to a raster distortions correcting device for a picture tube of a video display apparatus.

Typically, in, for example, projection television receivers, North-South pincushion distortions, resulting in curved displayed horizontal lines of a cross-hatched pattern, are corrected by generating a convergence current component in a convergence winding. When the cathode ray tube (CRT) of a projection receiver having rear projection lens has a relatively flat phosphor surface, the convergence current component is obtained by modulating or multiplying a horizontal rate parabola signal with a vertical rate sawtooth signal and applying the modulated signal to an amplifier that is coupled to the convergence winding.

In order to reduce the distance from the CRT faceplate to the screen on which the displayed image is made visible to the viewer, a curved phosphor surface is utilized having a radius of curvature of the type that tends to increase North-South pincushion distortions relative to what would be obtained had the aforementioned phosphor surface been flat. Similarly, outer North-South pincushion distortions, i.e., at the top/bottom of the displayed image, are corrected by the aforementioned current in the convergence winding with a higher degree of modulation than is required when the phosphor surface of the CRT is flat. The result is that the distortions of the displayed lines at the top/bottom of the cross-hatched pattern are corrected. Disadvantageously, the high degree of modulation tends to introduce inside North-South pincushion distortions, midway between the screen center and the screen top and bottom edges.

In a raster distortion correction arrangement, embodying an inventive feature, a vertical rate sinusoidal signal modulates a horizontal rate parabola signal. The modulated signal is applied to the convergence winding to provide S-shaping of the vertical rate sawtooth signal so as to reduce the inside pincushion distortion. The sinusoidal signal is produced by low pass filtering and phase shifting a vertical rate parabola signal. The vertical rate parabola signal is produced by integrating a vertical rate sawtooth signal.

Typically, the vertical rate sawtooth signal is obtained in a sawtooth signal generator from a pulse signal that is produced in a counter. When the television receiver is tuned for receiving a composite video signal, the counter changes state at a rate that is determined by the receiver horizontal oscillator which is phase locked to a horizontal synchronizing signal of the received composite video signal.

During a transient interval that occurs, for example, after the user effectuates television signal channel change, the synchronizing signal is absent. Such situation can also occur when synchronization lock is lost because of other reasons. During this interval the horizontal oscillator is free running at a frequency very close to its horizontal value. The vertical counter count is altered so that the vertical frequency is locked to the horizontal oscillator but at a vertical frequency that is 10% lower than in normal television signal reception. This feature maintains the integrity of on screen displayed images and provides fast vertical phase lock when normal television signal reception is resumed. The result is that, when the synchronizing signals are absent, the frequency of the counter output pulse signal is lower by about 10% than during normal television signal reception.

Consequently, the amplitude of each of the vertical rate sawtooth signal and of the vertical rate parabola signal tends to increase. The increased amplitude may produce a DC or average voltage level shift of the vertical rate parabola signal. Such different DC voltage remains as long as normal television signal reception has not resumed.

The DC, average level reverts back to its normal level after normal television signal reception has resumed. However, a transient interval that elapses while the DC level is being restored may be long enough to produce a transient picture distortion. The transient picture distortion may appear as a vertical bounce of the displayed image especially at the vertical center. It may be desirable to reduce the duration and extent of the vertical bounce so that it becomes visually unobjectionable.

In accordance with another inventive feature, a non-linear element produces clipping of a peak amplitude of the vertical rate sawtooth signal, when, as a result of being at a lower frequency, the amplitude of the sawtooth signal tends to increase. Consequently, the DC, average level of the parabola signal changes less.

In accordance with still another inventive feature, the filter that produces the vertical rate sinusoidal signal from the parabola signal operates as a bandpass filter. The lower cut-off frequency of the filter is made sufficiently high so as to attenuate low frequency components that occur during the transient interval. In this way, vertical bounce is reduced.

A video display apparatus, embodying an aspect of the invention, generates a current in a winding that is mounted on a neck of a cathode ray tube for producing a deflection field that provides for beam landing error correction. A source of a synchronizing signal at a frequency that is related to a deflection frequency is provided. A sawtooth signal generator is responsive to the synchronizing signal for generating a sawtooth signal that is synchronized to the synchronizing signal. When the synchronizing signal is outside a normal operation range, a frequency of the sawtooth signal changes in a manner that tends to cause an increase in an amplitude of the sawtooth signal relative to the amplitude when the synchronizing signal is within the normal operation range. A peak of the amplitude of the sawtooth signal is clamped to prevent the amplitude of the sawtooth signal from increasing when the synchronizing signal is outside the normal operation range. A correction signal is generated at a frequency that is related to the deflection frequency and that is coupled to the winding for reducing beam landing error.

A video display apparatus, embodying another aspect of the invention, generates a current in a winding that is mounted on a neck of a cathode ray tube for producing a deflection field that provides for beam landing error correction. A source of a synchronizing signal at a frequency that is related to a deflection frequency is provided. A parabola generator is responsive to the synchronizing signal for generating a synchronized parabola signal at a frequency that is related to the deflection frequency. During a transient interval, when the synchronizing signal is outside a normal operation range, the parabola signal contains a transient component signal at a frequency that is substantially lower than the frequency of the parabola signal. A band-pass filter is responsive to the parabola signal for filtering out signal components of the parabola signal at frequencies that are higher than the parabola signal frequency to produce a sinusoidal signal. The sinusoidal signal is coupled to the winding. The band-pass filter has a lower cut-off frequency that reduces the lower frequency component signal.

FIG. 5 illustrates waveforms of the arrangement of FIG. 1, during a transient interval.

Figure 1:
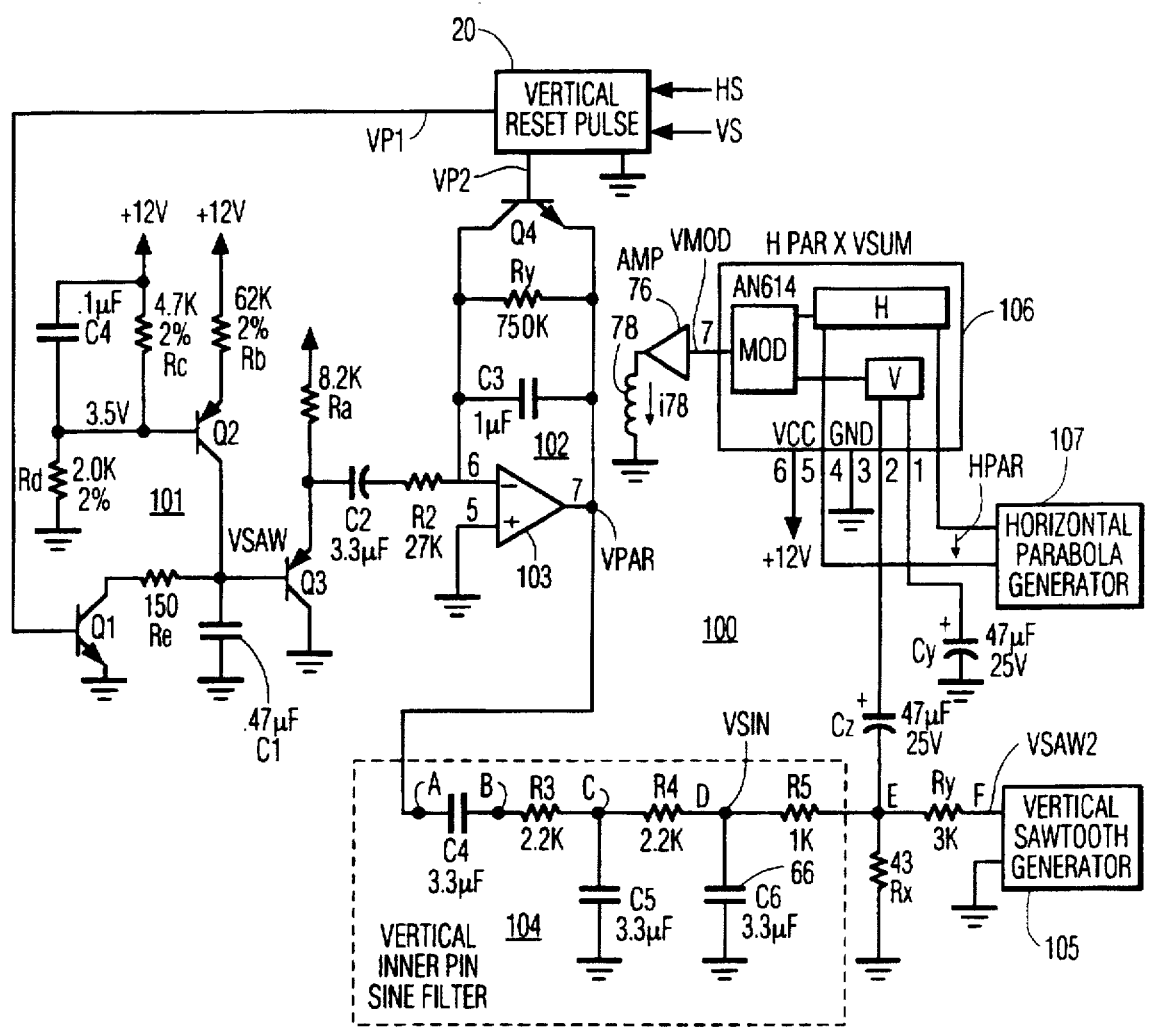
FIG. 1 illustrates a sinusoidal signal generator embodying an aspect of the invention, for correcting North-South pincushion distortion.

FIG. 1 illustrates a raster distortion correction circuit 100, embodying an aspect of the invention, of a projection television receiver having rear projection lens. A conventional vertical rate reset pulse generator 20 of the horizontal countdown type receives a horizontal rate sync signal HS at a horizontal frequency $f_H$ of 15.734 KHz or approximately 16 kilohertz and a vertical rate sync signal VS obtained from a composite video signal, not shown, in a manner well known.

Generator 20, generates a vertical rate pulse signal VP1 and a vertical rate pulse signal VP2. Generator 20 includes a horizontal oscillator, not shown, that is synchronized to signal HS and a counter, not shown, that produces signals VP1 and VP2 by frequency-dividing an output signal of the horizontal oscillator, not shown.

Signal HS is present when the receiver is tuned and receives the normal operation composite video signal. However, for example, immediately after the user changes the television receiver channel, the receiver becomes temporarily out of tune and signal HS is not received. Consequently, the horizontal oscillator is not phase-locked, or free running. The lack of phase-lock condition causes a frequency dividing chain in the counter to attain a different frequency division factor. As a result, generator 20 generates signals VP1 and VP2 at a frequency, as long as signal HS is absent, that is selected to be approximately 10% lower than in normal television signal reception. Thus, the frequency of signals VP1 and VP2 is 10% lower than a vertical rate $f_V$. Vertical rate $f_V$ is in the NTSC standard approximately 60 Hz.

Signal VP1 is coupled to a base of a switching transistor Q1 of a vertical rate sawtooth generator 101. Transistor Q1 is turned on, during vertical retrace, and is turned off, during vertical trace. A current source transistor Q2 has a collector that is coupled to the collector of transistor Q1 and to a ramp forming capacitor C1 for producing a vertical rate sawtooth signal VSAW in capacitor C1. An emitter resistor Rb is coupled to the emitter of transistor Q2. A base voltage of transistor Q2 is determined by a voltage divider formed by a resistor Rc coupled in series with a resistor Rd. A resistor Re limits a discharge current in capacitor C1.

FIGS. 2a–2d illustrate waveforms useful for explaining the operation of the circuit of FIG. 1. Similar symbols and numerals in FIGS. 1 and 2a–2d indicate similar items or functions.

Figure 2A:
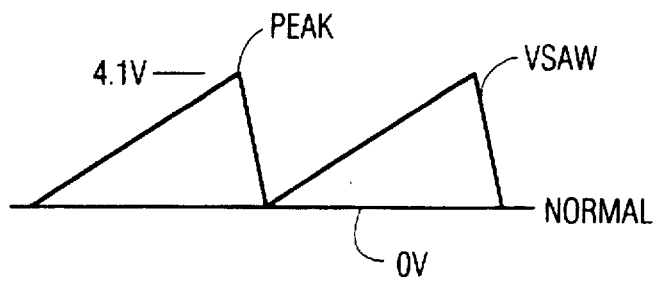
FIGS. 2a–2d illustrate waveforms useful for explaining the operation of the arrangement of FIG. 1.
Figure 2B:
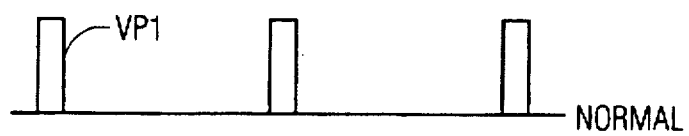

FIG. 2b illustrates schematically the pulses of signal VP1 during normal television signal reception when signal VP1 is at the vertical rate $f_V$ of the video signal, not shown. FIG. 2a illustrates the waveform of signal VSAW in such normal television signal reception. A peak PEAK of signal VSAW is at 4.1 volts. The base-collector junction of PNP transistor Q2 of FIG. 1 is close to being forward biased when the peak PEAK of signal VSAW occurs.

Figure 2C:
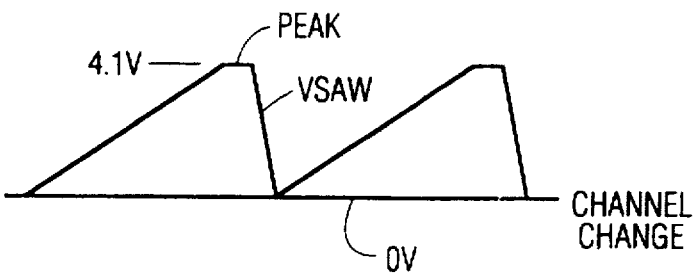
Figure 2D:
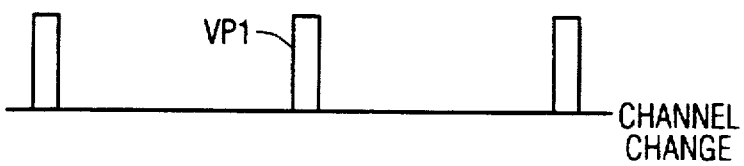

In accordance with an aspect of the invention, when the frequency of signal VP1 becomes lower than the normal operation vertical rate, for example, by about 10%, as a result of television receiver channel change, for the reasons explained before, the tendency of the peak amplitude of signal VSAW of FIG. 2c is to increase. However, the base-collector junction of transistor Q2 of FIG. 1 causes the peak of signal VSAW to be clipped such that the peak PEAK is clamped to 4.1 volts, as shown in FIG. 2d. As a result, the peak amplitude of signal VSAW is limited by transistor Q2 of FIG. 1 that operates in a nonlinear, clipping or clamping manner. Therefore, despite the decrease in the frequency of signal VSAW, the peak amplitude of signal VSAW does not increase.

Signal VSAW is coupled via an emitter follower transistor Q3 having an emitter resistor Rbx and AC-coupled via a capacitor C2 to a parabola signal generator 102 that produces a vertical rate parabola signal VPAR by integrating signal VSAW. Signal VPAR is developed at an output terminal of an amplifier 103. A resistor R2 and a capacitor C3 determine the amplitude of parabola signal VPAR. A transistor switch Q4 that is coupled across capacitor C3 and across a resistor Rz discharges capacitor C3, during vertical retrace.

FIGS. 3a–3d illustrate waveforms useful for explaining the operation of parabola generator 102 of FIG. 1. Similar symbols and numerals in FIGS. 1, 2a–2d and 3a–3d indicate similar items or functions.

Figure 3A:
FIGS. 3a–3e illustrate additional waveforms useful for explaining the operation of the arrangement of FIG. 1.
Figure 3B:
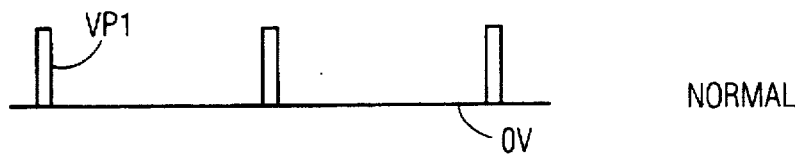
Figure 3C:

During normal video signal reception, the voltage across integrating capacitor C3 of FIG. 1 at the end of trace or the beginning of retrace is approximately zero and remains zero until the beginning of the next trace interval, as shown in the waveform of signal VPAR of FIG. 3a. FIG. 3c illustrates the waveform of signal VPAR that would have occurred without the peak clipping operation of transistor Q2 of FIG. 1.

Figure 3D:
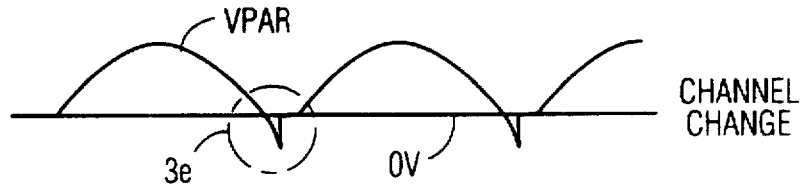
Figure 3E:
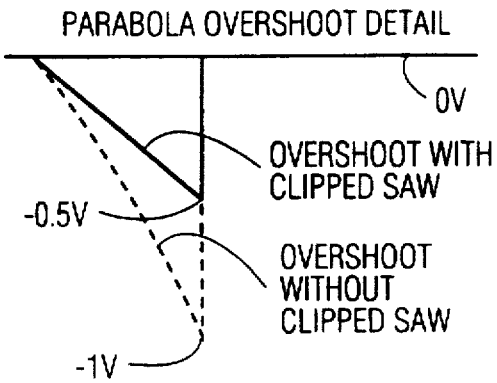

As shown in FIG. 3c, when no clipping is provided, because of the longer period of signal VSAW, an overshoot portion OS would have occurred in signal VPAR. Overshoot portion OS is reduced as a result of the clipping operation of transistor Q2 of FIG. 1. Overshoot portion OS is reduced because generator 102 integrates a flat peak portion of signal VSAW that is produced by the clipping operation rather than an upramping peak portion that would have occurred without the clipping operation. For clarity purposes, FIG. 3d shows portion OS in a magnified way. In the magnified portion OS of FIG. 3c, the reduced overshoot that occurs when clipping occurs is demonstrated. As shown in FIG. 3a, the clipping of signal VSAW reduces the magnitude of portion OS. As a result, the low frequency transient in signal VPAR that occurs after television receiver channel is changed is, advantageously, reduced.

Parabola signal VPAR is coupled via a bandpass filter 104, embodying another aspect of the invention, that produces from parabola signal VPAR a sinusoidal signal VSIN. Sinusoidal signal VSIN is coupled via a resistor R5 to a terminal E and summed with a vertical sawtooth signal VSAW2. Signal VSAW2 is coupled via a resistor Ry to terminal E. Signal VSAW2 is produced in a conventional manner in a sawtooth generator 105. A sum signal VSUM produced at terminal E is AC coupled via a capacitor Cz to a vertical amplifier 106a of a conventional multiplier or modulator 106. A second input terminal of amplifier 106a is at A/C ground potential by the operation of a capacitor Cy. Modulator 106 includes an amplifier 106b that receives a horizontal parabola signal HPAR. Signal HPAR is produced in a conventional horizontal parabola generator 107. Modulator 106 generates a modulated output signal VMOD. Output signal VMOD is coupled via a conventional power amplifier 76 to an auxiliary vertical convergence coil 78 of the CRT. Other waveforms that may also be coupled via amplifier 76 to coil 78 are not shown for simplification purposes.

A current i78 in coil 78 varies a magnetic field, not shown, produced by coil 78 for providing vertical convergence and for reducing North-South pincushion distortion.

Amplifier 76 operates as a voltage-to-current converter. The operation of amplifier 76 may be similar to that described in U.S. Pat. No. 4,961,032 in the name of Rodriguez-Cavazos, entitled, DUAL POWER SOURCE OUTPUT AMPLIFIER.

FIGS. 4a–4d illustrate waveforms obtained by simulation that are useful for explaining the steady state operation of filter 104 of FIG. 1. Similar symbols and numerals in FIGS. 1, 2a–2d, 3a–3d and 4a–4d indicate similar items or functions.

Figure 4A:
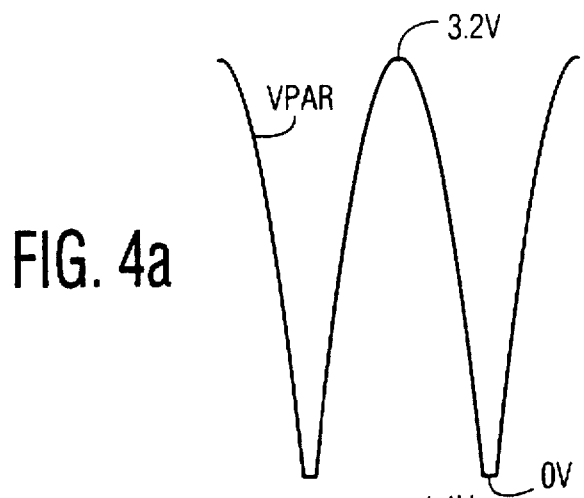
FIGS. 4a–4d illustrate further waveforms useful for explaining the operation of the arrangement of FIG. 1.
Figure 4B:
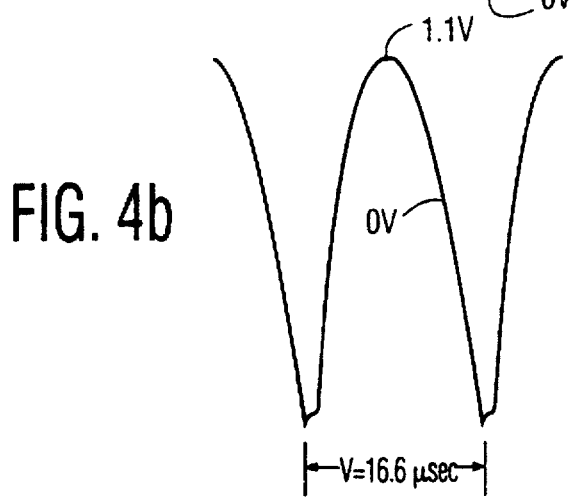

Parabola signal VPAR of FIG. 4a is coupled via a capacitor C4 of FIG. 1 to a resistor R3. The waveform of FIG. 4b at a terminal B of FIG. 1 between capacitor C4 and resistor R3 does not have a DC component. The value of capacitor C4 is sufficiently small such that low frequency components that could produce picture bounce in the vertical direction, as explained before, are significantly attenuated. The waveform of FIG. 4b at terminal B phase-leads that of signal VPAR of FIG. 4a.

Figure 4C:
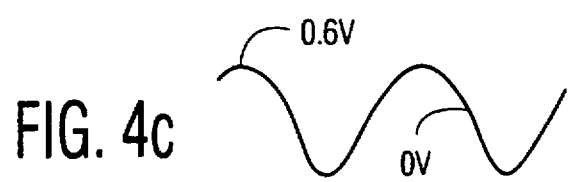
Figure 4D:
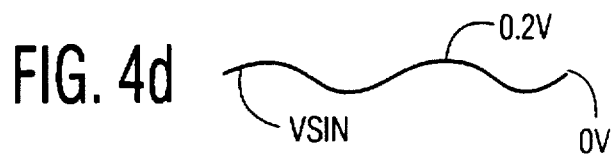

Resistor R3 of FIG. 1 is coupled to a capacitor CS to form a first low-pass filter section of band-pass filter 104. A signal developed at a terminal C in capacitor CS that is shown in FIG. 4c demonstrates that a phase lag has been introduced and high frequency components have been attenuated. A second low-pass filter section of filter 104 of FIG. 1 is formed by a resistor R4 that is coupled between terminals D and E and a capacitor C6. The waveform at terminal D that is shown in FIG. 4d shows that further attenuation of the high frequency components has occurred between terminals C and D of FIG. 1. The total phase shift of signal VSIN of FIG. 4d is such that zero crossing of sinusoidal signal VSIN is at the vertical mid-screen point.

FIGS. 5a–5c illustrates waveforms useful for explaining the transient response of filter 104 of FIG. 1. Similar symbols and numerals in FIGS. 1, 2a–2d, 3a–3d, 4a–4d and 5a–5c indicate similar items or functions.

The waveforms of FIG. 5a–5c were obtained by simulation for demonstrating how the DC, or average of a given period of signal VSIN of FIG. 5b settles to steady state level, during a transient interval TR that follows an increase in the frequency of signal VSIN. The increase in frequency occurs when, for example, sync signal HS of FIG. 1 is restored after being absent. This situation occurs when the user changes channel.

As shown in FIG. 5b, after a transition interval of approximately 100 msec, the DC or average of signal VSIN is at zero, its steady state level. Advantageously, low frequency components that occur, during the aforementioned transient interval, are significantly reduced and decay fast in sinusoidal signal VSIN after normal television signal reception resumes.

I claim:

1. A video display apparatus for generating a current in a winding that is mounted on a neck of a cathode ray tube for producing a deflection field that provides for beam landing error correction, comprising:

a source of a synchronizing signal at a frequency that is related to a deflection frequency;

a sawtooth signal generator responsive to said synchronizing signal for generating a sawtooth signal that is synchronized to said synchronizing signal such that when said synchronizing signal is outside a normal operation range (channel change), a frequency of said sawtooth signal changes in a manner that tends to cause an increase in an amplitude of said sawtooth signal relative to the amplitude when said synchronizing signal is within the normal operation range;

means coupled to said sawtooth generator for clamping a peak of said amplitude of said sawtooth signal to prevent said amplitude of said sawtooth signal from increasing when said synchronizing signal is outside the normal operation range; and means responsive to said sawtooth signal for generating a correction signal at a frequency that is related to the deflection frequency and that is coupled to said winding for reducing beam landing error.

2. An apparatus according to claim 1 further comprising, a parabola generator responsive to said sawtooth signal for generating a parabola signal and a filter responsive to said parabola signal for generating said sinusoidal signal that is phase-shifted with respect to said parabola signal.

3. An apparatus according to claim 1 further comprising, means responsive to said synchronizing signal that is at a frequency related to a horizontal deflection frequency for generating a periodic switching control signal at a frequency that is related to a vertical deflection frequency that is synchronized to said synchronizing signal in steady state operation such that, when said synchronizing signal is outside a normal operation range, said switching control signal is at a frequency that is different (lower) from that in steady state operation, said switching control signal being coupled to said sawtooth generator for controlling when said given cycle of said sawtooth signal occurs.

4. An apparatus according to claim 1 wherein said correction signal generating means generates a sinusoidal signal at a frequency that is related to the deflection frequency that is coupled to said winding for reducing beam landing error.

5. An apparatus according to claim 1 wherein said frequency of said sawtooth signal is related to a vertical deflection frequency.

6. A video display apparatus for generating a current in a winding that is mounted on a neck of a cathode ray tube for producing a deflection field that provides for beam landing error correction, comprising:

a source of a synchronizing signal at a frequency that is related to a deflection frequency (vertical);

a parabola generator responsive to said synchronizing signal for generating a synchronized parabola signal at a frequency that is related to said deflection frequency such that, during a transient interval, when said synchronizing signal is outside a normal operation range, said parabola signal contains a transient component signal at a frequency that is substantially lower than said frequency of said parabola signal; and a band-pass filter responsive to said parabola signal for filtering out signal components of said parabola signal at frequencies that are higher than said parabola signal frequency to produce a sinusoidal signal that is coupled to said winding, said band-pass filter having a lower cut-off frequency that reduces said lower frequency component signal.

7. An apparatus according to claim 6 wherein said transient interval occurs following restoration of said synchronizing signal to normal operation range.

8. An apparatus according to claim 6 wherein said display apparatus is included in a television signal receiver and wherein synchronizing signal is outside;side the normal operation range when a television channel change occurs.

9. An apparatus according to claim 6 wherein said band-pass filter comprises a capacitor that blocks said lower frequency component signal.

10. An apparatus according to claim 6 wherein said transient component signal is capable of producing a picture bounce on a display screen and wherein said filter filters out said transient component signal in a manner to avoid the picture bounce.

11. A video display apparatus for generating a current in a winding that is mounted on a neck of a cathode ray tube for producing a deflection field that provides for beam landing error correction, comprising:

a source of a synchronizing signal at a frequency that is related to a vertical deflection frequency;

a generator responsive to said synchronizing signal for generating a synchronized correction signal at a frequency related to said vertical deflection frequency that is coupled to said winding to produce said winding current in accordance therewith, such that, during a transient interval, when said synchronizing signal is outside a normal operation range, said correction signal contains a transient component signal at a frequency that is substantially lower than said vertical deflection frequency, said lower frequency transient component signal being capable of producing picture bounce on a display screen, if permitted to affect said winding current; and a filter responsive to said correction signal for filtering out said lower frequency component signal to substantially prevent said correction signal from producing picture bounce.

* * * * *